United States Patent [19]

Debost

[11] 4,216,070
[45] Aug. 5, 1980

[54] PROTECTION OF STUD-LINK CHAIN-CABLES BY MEANS OF SOLUBLE ANODES

[75] Inventor: Robert Debost, Jurancon, France

[73] Assignee: Societe Nationale Elf Aquitaine (Production), Courbevoie, France

[21] Appl. No.: 24,689

[22] Filed: Mar. 28, 1979

[30] Foreign Application Priority Data

Mar. 29, 1978 [FR] France ................................. 78 09035

[51] Int. Cl.$^2$ .............................................. C23F 13/00
[52] U.S. Cl. ........................................ 204/197; 59/84
[58] Field of Search ...................... 204/148, 197; 59/84

[56] References Cited

U.S. PATENT DOCUMENTS

| 2,870,079 | 1/1959 | McCall | 204/197 |
| 3,635,813 | 1/1972 | Drisko et al. | 204/197 |
| 3,864,906 | 2/1975 | Cullen | 59/84 |
| 4,036,010 | 7/1977 | Hedman | 59/84 |

Primary Examiner—G. L. Kaplan
Attorney, Agent, or Firm—Brisebois & Kruger

[57] ABSTRACT

A system for cathodic protection of anchor chain-cables.

The chain-cable in this system comprises at least one stud-link, and at least the outer layer of the stud of at least one such link consists of soluble anodic material.

The purpose of this device is to ensure unbroken cathodic protection of an anchor-chain for a given number of years.

5 Claims, 4 Drawing Figures

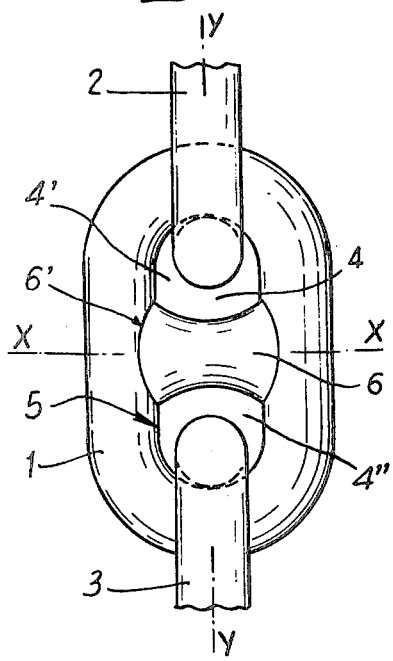
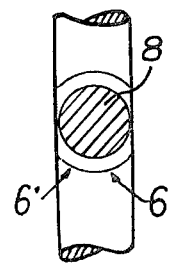
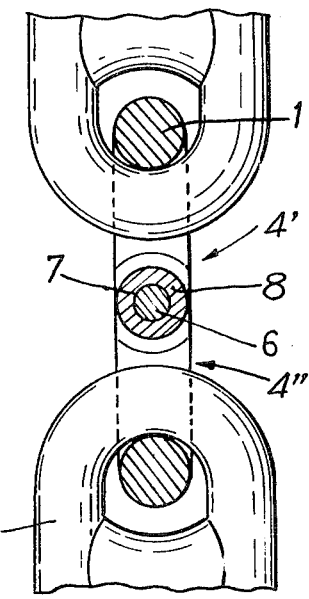
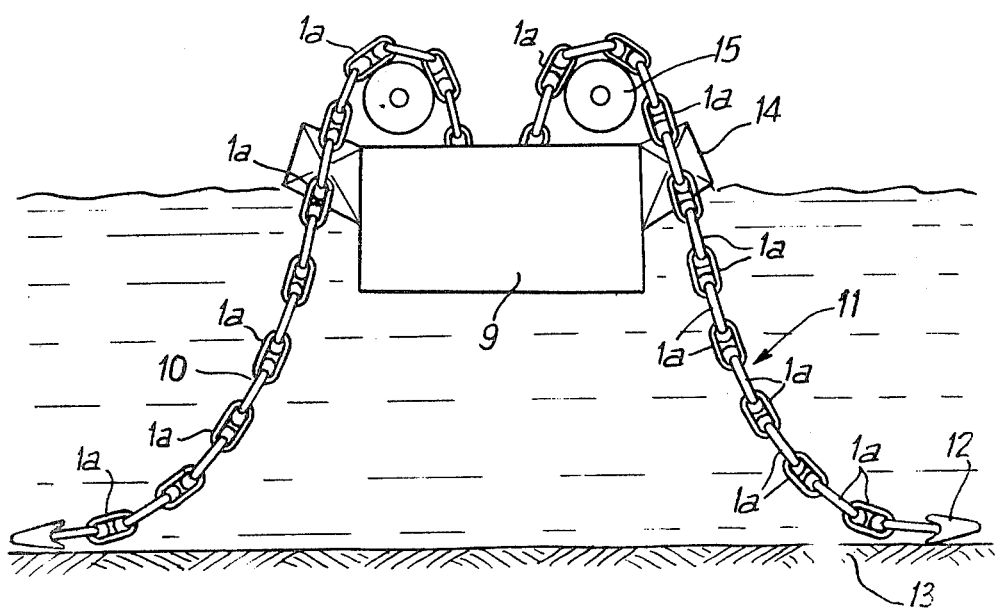

PROTECTION OF STUD-LINK CHAIN-CABLES BY MEANS OF SOLUBLE ANODES

This invention concerns the protection of anchor chain-cables which have to remain in position under the sea for long periods of time.

Oil-production rigs at sea must remain in operation until the oil-field is exhausted; this usually means from ten to thirty years, sometimes even longer.

The cost of installing production or storage facilities on supports fixed to the seabed increases with the depth of water. Below a certain depth, which can be determined in economic terms, it becomes preferable to use articulated columns for support, or even a floating platform, in which case the problem of anchoring these to the seabed arises.

Various methods exist in the previous art for cathodic protection of rigid supporting systems, but it is much more difficult to protect chain-cables. Links move about in relation to one another, and have to pass through stretching tackle, cable-wheels or jack-operated stretchers. Because of this, soluble anodes have to be installed while the mooring line is being laid, after it has run through the stretching tackle. This is a complicated operation, involving considerable extra outlay of time.

Consideration has been given to applying various protective coverings to the links, such as pitch, epoxy resins and other kinds of paint; however, friction at points where the links touch one another makes it unlikely that such protection would last.

The idea has also been put forward of using special non-corroding metal for the links, particularly a special type of steel; however, investigation has shown that the mechanical properties of such metals are inferior to those of the steel normally used, and that they are more expensive.

These difficulties are overcome in the new process described herein, in which soluble anodes are fixed to links in a position in which they are shielded from mechanical wear.

In this new device to protect anchor chain-cables, of the type comprising at least one stud-link, by means of a soluble anode, at least the outer layer of at least one link-stud consists of soluble anodic material.

In certain embodiments, the whole stud consists of soluble anodic material.

In other embodiments, links containing a stud in which at least the outer layer consists of soluble anodic material are located at various points along the chain-cable.

In a recommended embodiment, every link in the chain-cable contains a stud of which at least the outer layer consists of a soluble anodic material.

It will be easier to understand the invention from the following description, given merely as one possible embodiment, and illustrated in the accompanying figures:

FIG. 1 is a view of a stud-link for an anchor chain-cable

FIG. 2 is a cross-sectional view of a stud-link as shown in FIG. 1, in which the outer layer of the stud consists of an anodic material FIG. 3 is a cross-section of a stud consisting entirely of an anodic material FIG. 4 is a diagrammatical view of a floating platform anchored by means of stud-link chain-cables.

FIG. 1 shows a link 1, forming part of an anchor chain-cable of a type known in the previous art, and situated between two other links 2 and 3, the illustration of each of which is cut off by a conventional cross-sectional line. This type of link is usually produced by cutting off part of a steel bar, which is shaped by heating and bending, then welded. This link contains an opening 4, the circumference 5 of which forms a continuous oval shape, with two symmetry axes: xx, which intersects the oval curve 5 at the two points at which the radius of curve is greatest, and yy perpendicular to xx.

The link 1 contains a stud 6 located on the axis xx. This stud usually consists of part of a bar, which is first positioned along the axis yy of a link, then brought into contact with the inside perimeter of the link at each end, by application of a compressive force on each side of the link. The stud ends may be strengthened by a weld bead 6'.

The stud 6, resting on two opposite points on the inside circumference of the link 1, divides the opening 4 into two half-openings 4' and 4''.

FIG. 2 is a cross-sectional view of link 1 along the plane yy shown in FIG. 1. The figure also shows links 2 and 3, which pass through the opening 4 in link 1. A stud 6, resting on two opposite points on the circumference of the opening 4, divides it into two half-openings 4' and 4''.

The cross-section through stud 6 shows a central steel core 7, surrounded by a concentric outer layer 8 of anodic material.

FIG. 3 shows the same cross-sectional view, of a whole stud 6 made of anodic material 8.

FIG. 4 is a diagrammatical view of a floating platform 9 anchored by means of chain-cables 10 and 11. A certain length of each chain-cable, ending in a conventional anchor 12, lies on the seabed 13, connecting it to the floating platform 9. Each chain-cable passes through a blocking device 14 on the platform, then over the pulley 15 of a stretching device.

Chain-cable 10 comprises a number of stud-links 1a, in which the outer layer of the stud is made of an anodic material, or in which the whole stud consists of such material.

In chain-cable 11, all links are of this type 1a, suggesting that it will be better protected than chain-cable 10.

The arrangement adopted for these soluble chain-protection anodes means that they are located within a protected area inside the normal circumference of the chain-cable through blocking and stretching devices on the floating platform. This means that these chain-cables can be laid in the same way as ordinary, unprotected chain-cables.

FIG. 4 is a simple diagrammatical view, and the invention applies to any other method of anchoring that exists or can be devised from existing resources. In deep water, chain-cable is used only for the part of the mooring line nearest the seabed and resting on the seabed, ending in the anchor 12, while the rest of the line, in other words the greatest part of its length, is a cable, possibly ending in a length of chain-cable for use in the stretching devices. In this case, the new protective process will be used only for the lengths of chain-cable.

FIG. 4 shows stretching devices, although in certain types of floating platforms anchor lines, after being stretched, are blocked, then detached from these stretching devices, which are moved to another platform or to a tender.

The invention also applies to the protection of any chain-cable component or body of similar form, which has to remain submerged in seawater for long periods of time.

What is claimed is:

1. A cathodically protected anchor chain having a plurality of links, each link having an inner circumference, at least one stud extending between opposite points on the inner circumference of at least one of said links, said one stud being located entirely within the outer circumference of said one link so as to avoid damage to the stud and facilitate handling of the chain, at least an outer layer of said stud being constructed of anodic material.

2. The chain of claim 1 wherein said stud comprises a central core of steel within said outer layer of anodic material.

3. The chain of claim 1 wherein the entire stud is anodic material.

4. The chain of any one of claims 1 to 3 wherein a stud is provided in each one of a plurality of said links.

5. The chain of any one of claims 1 to 3 wherein each link contains a stud.